United States Patent [19]

Nishiyama et al.

[11] Patent Number: 4,611,793
[45] Date of Patent: Sep. 16, 1986

[54] LEAF SPRING ASSEMBLY FOR WHEEL SUSPENSION

[75] Inventors: Kazuo Nishiyama; Yasuhiro Mishima, both of Toyota; Kiyoaki Kuwayama, Nagoya, all of Japan

[73] Assignees: Toyota Jidosha Kabushiki Kaisha; Chuohatsujyo Kabushiki Kaisha, Aichi, both of Japan

[21] Appl. No.: 623,198

[22] Filed: Jun. 21, 1984

[51] Int. Cl.$^4$ .......................... B60G 11/02; F16F 1/36
[52] U.S. Cl. ...................................... 267/52; 267/53; 267/149
[58] Field of Search .............. 280/718, 719, 720, 669; 267/47, 48, 49, 53, 52, 148, 149

[56]  References Cited

U.S. PATENT DOCUMENTS

| | | | |
|---|---|---|---|
| 2,587,522 | 2/1952 | Pilkington | 267/52 |
| 3,061,301 | 10/1962 | Bajer et al. | 267/52 |
| 3,079,139 | 2/1963 | Greene et al. | 267/47 |
| 3,250,546 | 5/1966 | Allison | 267/52 |
| 3,968,958 | 7/1976 | Huchett et al. | 267/149 |

FOREIGN PATENT DOCUMENTS

| | | | |
|---|---|---|---|
| 0118338 | 7/1983 | Japan | 267/148 |
| 0166147 | 10/1983 | Japan | 267/148 |
| 2075441 | 11/1981 | United Kingdom | 280/718 |

Primary Examiner—Duane A. Reger
Assistant Examiner—Alvin Oberley
Attorney, Agent, or Firm—Parkhurst & Oliff

[57] ABSTRACT

A leaf spring assembly comprises a longitudinal leaf spring made of fiber reinforced plastics, a pair of retainer plates attached to opposite faces of the leaf spring, and a pair of fastening U-bolts and nuts for clamping the retainer plates to the leaf spring and mounting the same on an axle housing. The leaf spring is provided only at its compression surface with a protrusion which is located substantially at the central portion of the leaf spring, and one of the retainer plates is formed with an indented portion which is coupled to the protrusion of the leaf spring to clamp the leaf spring at its central portion.

2 Claims, 12 Drawing Figures

LEAF SPRING ASSEMBLY FOR WHEEL SUSPENSION

BACKGROUND OF THE INVENTION

The present invention relates to a leaf spring assembly for wheel suspensions, and more particularly to a leaf spring assembly of the type which comprises a longitudinal leaf spring made of fiber reinforced plastics, a pair of retainer plates attached to opposite surfaces of the leaf spring, and a pair of fastening U-bolts and nuts for clamping the retainer plates to the leaf spring and mounting the same on an axle housing.

In such a conventional leaf spring assembly as described above, it is required to facilitate positioning of the leaf spring at its center during mounting process of the leaf spring assembly. For such requirement, the central portion of the leaf spring is protruded or indented at its opposite faces, while the retainer plates are respectively indented or protruded to be coupled with the protruded or indented portions of the leaf spring. In FIG. 9(a) there is illustrated such a conventional leaf spring assembly in which a longitudinal leaf spring 1 of fiber reinforced plastics is provided at its central portion with a pair of upper and lower protrusions 2a and 2b, while a pair of upper and lower retainer plates 3 and 4 are respectively formed with protruded portions 3a and 4a coupled with the protrusions 2a and 2b of leaf spring 1. Thus, the leaf spring 1 is accurately positioned and retained in place by means of the retainer plates 3 and 4 coupled thereto. It has, however, been observed that as is illustrated in FIG. 9(b), there occur cracks 2c along with reinforcement fibrous sheet-like materials in the upper protrusion 2a of leaf spring 1, resulting in decrease of durability of the leaf spring 1. In FIG. 10(a) there is illustrated another conventional leaf spring assembly in which a longitudinal leaf spring 5 of fiber reinforced plastics is protruded upwardly at its central portion to form an upper protrusion 6a and a lower indented portion 6b, while a pair of retainer plates 7 and 8 are respectively provided with protruded portions 7a and 8a coupled with the protruded and indented portions 6a and 6b of the leaf spring 5. Thus, the leaf spring 5 is accurately positioned and retained in place by means of the retainer plates 7 and 8 coupled thereto. It has, however, been observed that as is illustrated in FIG. 10(b), there occur cracks 6c along the reinforcement fibrous sheet-like materials in the upper protruded portion 6a of leaf spring 5, resulting in decrease of durability of the leaf spring 5.

SUMMARY OF THE INVENTION

It is, therefore, a primary object of the present invention to provide an improved leaf spring assembly which is accurately positioned and retained in place without causing any cracks in the leaf spring of fiber reinforced plastics.

Another object of the present invention is to provide an improved leaf spring assembly, having the above-mentioned characteristic, capable of firmly retaining pad members of elastic material interposed between the leaf spring and the retainer plates.

According to the present invention, the primary object is accomplished by providing a leaf spring assembly which comprises a longitudinal leaf spring made of fiber reinforced plastics having a first surface to be applied with a tension force and a second surface to be applied with a compression force, a pair of retainer plates attached to the first and second surfaces of the leaf spring, and a pair of fastening U-bolts and nuts for clamping the retainer plates to the leaf spring and mounting the same on an axle housing, wherein the longitudinal leaf spring is provided only at the second surface thereof with a protrusion which is located substantially at the central portion of the leaf spring, the protrusion being made of a number of laminated short fibrous sheet-like materials saturated with synthetic resin, the short fibrous sheet-like materials being laminated independently from reinforcement fibrous sheet-like materials in the leaf spring, and wherein one of the retainer plates is formed with an indented portion which is coupled with the protrusion of the leaf spring to clamp the leaf spring at its central portion.

Additionally, the secondary object of the present invention is accomplished by providing an improved leaf spring assembly, having the above-mentioned construction, in which a pair of pad members of elastic material are respectively interposed between the retainer plates and the leaf spring, and in which the retainer plate coupled with the protrusion of the leaf spring is further provided with a pair of protrusions which are arranged adjacent the indented portion of the retainer plate to stick to one of the pad members.

BRIEF DESCRIPTION OF THE DRAWINGS

Additional objects and advantages of the present invention will be readily apparent from the following detailed description of certain preferred embodiments thereof when taken together with the accompanying drawings, in which.

DETAILED DESCRIPTION OF THE PREFERRED EMBODIMENTS

Figure 1:
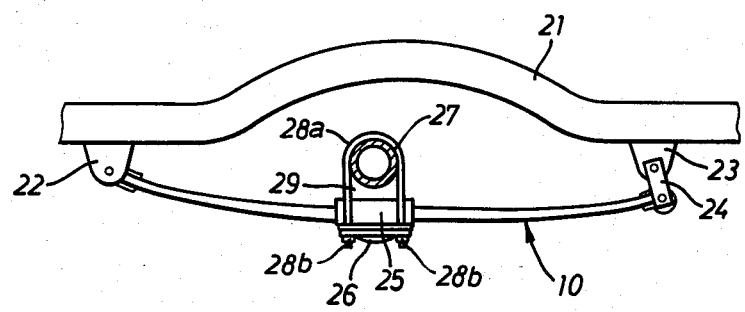
FIG. 1 illustrates an arrangement of a leaf spring assembly in accordance with the present invention.

Referring now to the drawings, in FIG. 1 there is illustrated an arrangement of a leaf spring assembly in accordance with the present invention which comprises a longitudinal leaf spring 10 connected at its front end to a stationary bracket 22 and at its rear end to a shackle 24. The stationary bracket 22 is welded to a rear member 21 of a vehicle body structure, and the shackle 24 is pivoted to a stationary bracket 23 welded to the rear member 21. The longitudinal leaf spring 10 is clamped at its central portion by a pair of fastening U-bolts 28a and nuts 28b through upper and lower metallic retainer plates 25 and 26. The U-bolts 28a are mounted on a rear axle housing 27 and fastened by nuts 28b through a bracket 29 to mount the leaf spring 10 substantially at its central portion in place.

Figure 2:
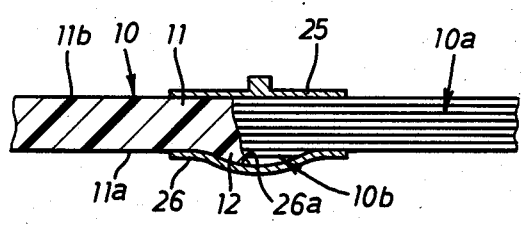
FIG. 2 is a partly enlarged sectional view of the leaf spring assembly shown in FIG. 1.

As can be well seen in FIG. 2, the longitudinal leaf spring 10 is made of a number of laminated reinforcement fibrous sheet-like materials 10a saturated with synthetic resin such as epoxy resin. The upper surface 11b of leaf spring 10 is flat, while the bottom surface 11a of leaf spring 10 is provided with a protrusion 12 which is located substantially at the central portion of leaf spring 10. The central protrusion 12 of leaf spring 10 is made of a number of laminated short fibrous sheet-like materials 10b saturated with synthetic resin, in which the short fibrous sheet-like materials 10b are laminated independently from the laminated reinforcement fibrous sheet-like materials 10a of leaf spring 10. As can be well seen in FIGS. 2 and 3, the upper retainer plate 25 has a U-shaped cross section, while the lower retainer plate 26 is formed with an indented portion 26a which is coupled with the central protrusion 12 of leaf spring 10.

Figure 9A:
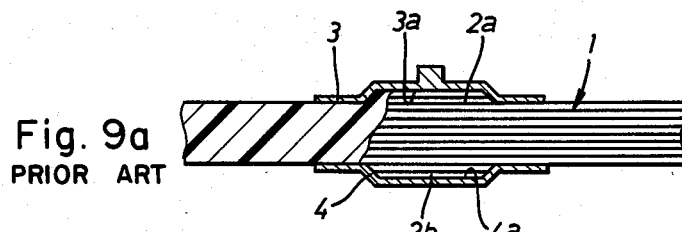
FIGS. 9(a), 9(b), 10(a) and 10(b) illustrate conventional leaf spring assemblies.
Figure 9B:
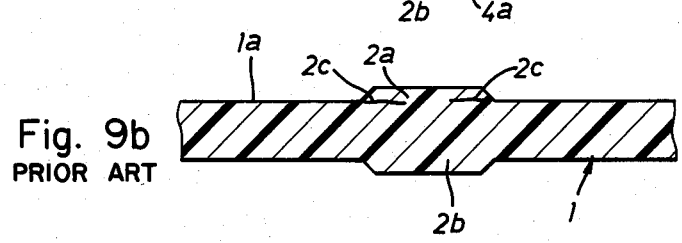
Figure 10A:
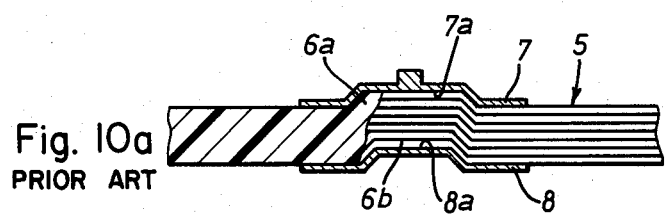
Figure 10B:
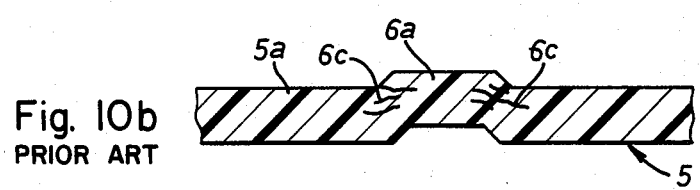

During mounting process of the leaf spring 10, the lower retainer plate 26 is positioned by engagement with the central protrusion 12 of leaf spring 10 at its indented portion 26a, while the upper retainer plate 25 is coupled over the upper flat surface of leaf spring 10 and engaged at its peripheral flanges with the lower retainer plate 26. Subsequently, the upper and lower retainer plates 25 and 26 are clamped by the U-bolts 28a and nuts 28b to mount the leaf spring 10 substantially at its central portion on the rear axle housing 27. Thus, the leaf spring 10 is accurately positioned and retained in place. In operation of the leaf spring assembly, the upper surface 11b of leaf spring 10 is applied with a tension force, while the bottom surface 11a of leaf spring 10 is applied with a compression force In such a mounting construction of the leaf spring assembly, such cracks as illustrated in FIGS. 9(b) and 10(b) do not occur at the tension surface side of leaf spring 10 because of no provision of any protruded portion at the upper portion of leaf spring 10. Meanwhile, no cracks occur at the compression surface side of leaf spring 10 because the central protrusion 12 is located at the bottom portion of leaf spring 10 and is formed independently from the reinforcement fibrous sheet-like materials 10a in leaf spring 10.

Figure 4:
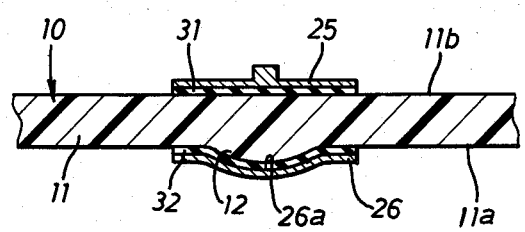
FIG. 4 is a partly enlarged sectional view of a modification of the leaf spring assembly shown in FIG. 2.

In FIG. 4 there is illustrated a modification of the above-described leaf spring assembly, in which upper and lower pad members 31 and 32 of elastic material such as synthetic rubber are interposed between the upper retainer plate 25 and the upper surface of leaf spring 10 and between the lower retainer plate 26 and the bottom surface of leaf spring 10.

Figure 5:
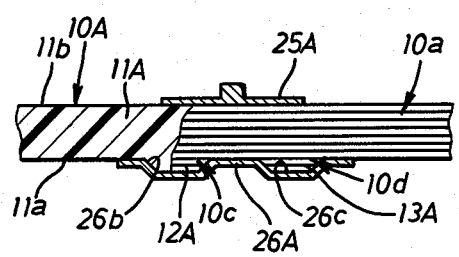
FIGS. 5 and 6 illustrate other modifications of the leaf spring assembly.
Figure 6:
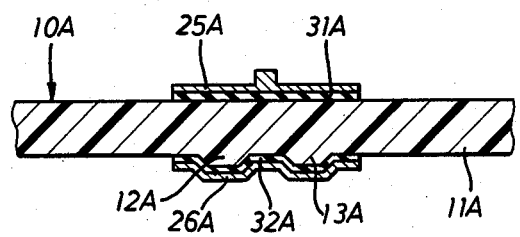

In FIG. 5 there is illustrated another embodiment of the present invention, in which a longitudinal leaf spring 10A of fiber reinforced sythetic resin is provided at its bottom surface or compression surface 11a with a pair of front and rear protrusions 12A and 13A which are located substantially at the central portion of leaf spring 10. The protrusions 12A and 13A are respectively made of a number of laminated short fibrous sheet-like materials 10c, 10d saturated with synthetic resin, in which the short fibrous sheet-like materials 10c, 10d are respectively laminated independently from the laminated reinforcement fibrous sheet-like materials 10a of leaf spring 10A. In this embodiment, an upper metallic retainer plate 25A is adhered to the upper flat surface of the central portion of leaf spring 10A, while a lower metallic retainer plate 26A is formed with a pair of front and rear indented portions 26b and 26c which are coupled with the respective protrusions 12A and 13A of leaf spring 10A. The lower metallic retainer plate 26A is also adhered to the bottom surface 11a of leaf spring 10A. The other constructions are substantially the same as those in the embodiment shown in FIGS. 1 to 3. In FIG. 6 there is illustrated a modification of the above-described embodiment, in which upper and lower pad members 31A and 32A of elastic material are respectively interposed between the upper retainer plate 25A and the upper surface of leaf spring 10A and between the lower retainer plate 26A and the bottom surface of leaf spring 10A. With this modification, the upper and lower pad members 31A and 32A are firmly retained in place by engagement with the pair of indented portions 26b and 26c of lower retainer plate 26A. Thus, any displacement of the pad members 31A and 32A does not occur even if the leaf spring 10A is repeatedly applied with a load in a fore-and-aft direction.

Figure 3:
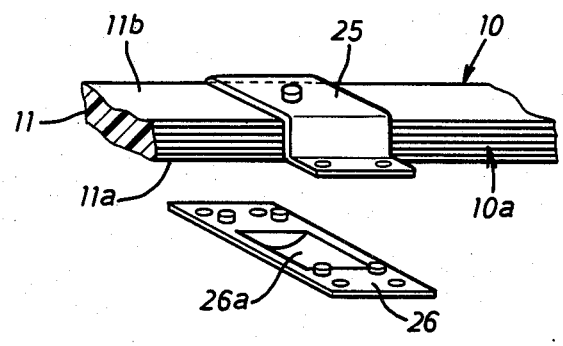
FIG. 3 is a perspective view illustrating component parts of the leaf spring assembly shown in FIG. 2.
Figure 7:
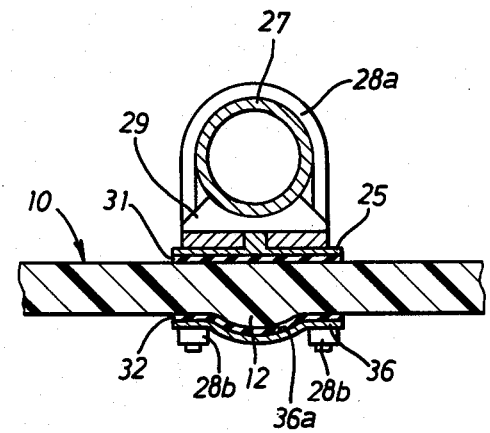
FIG. 7 illustrates another modification of the leaf shown assembly shown in FIG. 4.
Figure 8:
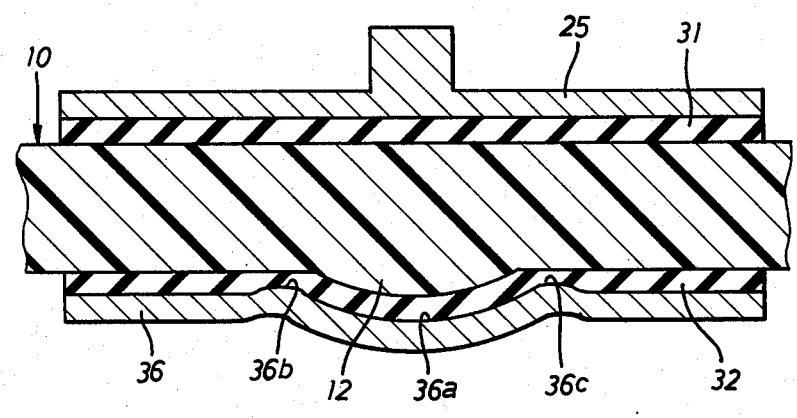
FIG. 8 is a partly enlarged sectional view of the modification of FIG. 7.

In FIGS. 7 and 8 there is illustrated another modification of the leaf spring assembly shown in FIGS. 1 to 3, which modification is substantially the same as the modification of FIG. 4 except for configuration of a lower retainer plate 36 corresponding to the lower retainer plate 26 in FIG. 4. As can be well seen in FIG. 8, the lower retainer plate 36 is formed with an indented portion 36a which is coupled with the central protrusion 12 of leaf spring 10 through the lower pad member 32. The lower retainer plate 36 is further provided with a pair of front and rear protrusions 36b and 36c adjacent the indented portion 36a. The front and rear protrusions 36b and 36c of retainer plate 36 are arranged to stick to the lower pad member 32. When the upper and lower retainer plates 25 and 36 are clamped to the leaf spring 10 through the pad members 31 and 32 by fastening of the U-bolts 28a and nuts 28a, the front and rear protrusions 36b and 36c of retainer plate 36 stick to the lower pad member 32 and retain it in place. Thus, any displacement of the pad members 25 and 36 does not occur even if the leaf spring 10 is repeatedly applied with a load in a fore-and-aft direction. Consequently, the clamping force of retainer plates 25 and 36 to leaf spring 10 is reliably maintained.

Although certain specific embodiments and modifications of the invention have been shown and described, it is obvious that many variations thereof are possible. The invention, therefore, is not intended to be restricted to the exact showning of the drawings and description thereof, but is considered to include reasonable and obvious equivalents.

What is claimed is:

1. A leaf spring assembly comprising:
   a longitudinal leaf spring made of fiber reinforced plastics having a first surface to be applied with a tension force and a second surface to be applied with a compression force, the first surface of said leaf spring being a flat surface, and the second surface of said leaf spring being provided with a protrusion located substantially at the central portion of said leaf spring, said protrusion being made of a number of laminated short fibrous sheet-like materials saturated with synthetic resin, said short fibrous sheet-like materials of said protrusion being laminated independently and separately from reinforcement fibrous sheet-like materials in said leaf spring;
   a pair of pad members of elastic material attached to the first and second surfaces of said leaf spring;
   a pair of retainer plates attached to the first and second surfaces of said leaf spring through said pad members, one of said retainer plates being formed with an indented portion coupled with the protrusion of said leaf spring through one of said pad members without any clearance to clamp said leaf spring at its central portion and being further provided with a pair of protruded portions which are arranged adjacent to the indented portion to retain said pad member in place by engagement therewith; and means for clamping said retainer plates to said leaf spring and mounting the same on an axle housing.

2. A leaf spring assembly comprising:

a longitudinal leaf spring made of fiber reinforced plastics having a first surface to be applied with a tension force and a second surface to be applied with a compression force, the first surface of said leaf spring being a flat surface, and the second surface of said leaf spring being provided with a pair of protrusions which are located substantially at the central portion of said leaf spring, said protrusions being respectively made of a number of laminated short fibrous sheet-like materials saturated with synthetic resin, each of said short fibrous sheet-like materials of said protrusions being laminated independently and separately from reinforcement fibrous sheet-like materials in said leaf spring;

a pair of pad members of elastic material attached to the first and second surfaces of said leaf spring;

a pair of retainer plates attached to the first and second surfaces of said leaf spring through said pad members, one of said retainer plates being formed with a pair of indented portions which are respectively coupled with the protrusions of said leaf spring through one of said pad members without any clearance to clamp said leaf spring at its central portion and to retain said pad member in place by engagement therewith; and means for clamping said retainer plates to said leaf spring through said pad members and mounting the same on an axle housing.

* * * * *